Aug. 19, 1952     R. D. SHERIDAN     2,607,123
MEASURING FINGER FOR ULTRA SENSITIVE COMPARATORS
Filed Nov. 14, 1949
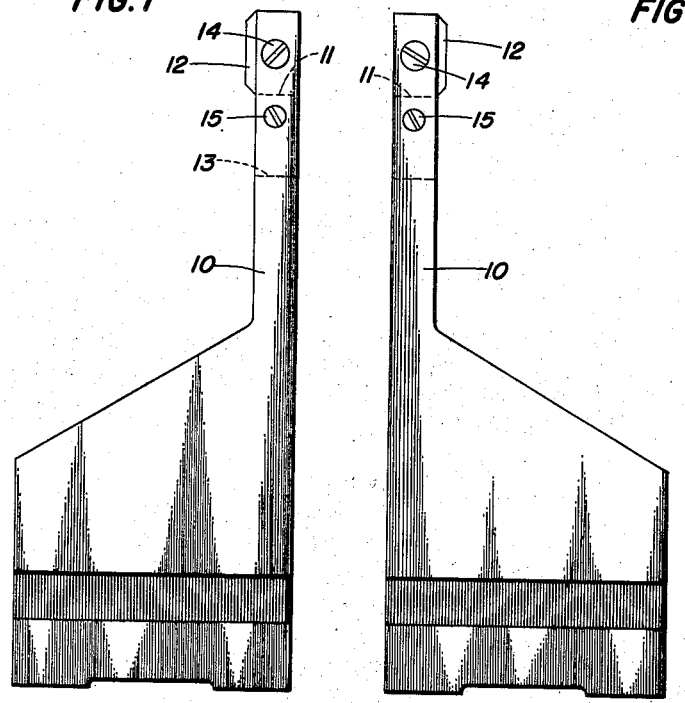
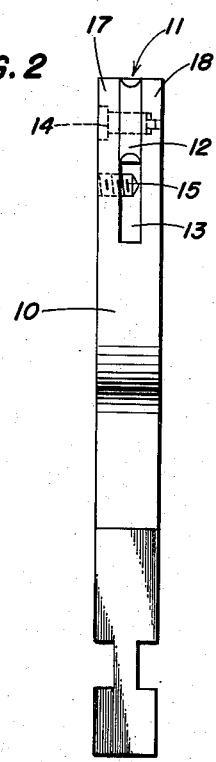
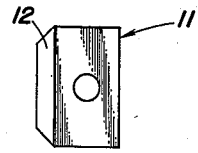
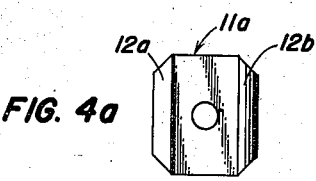
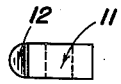
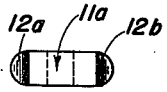
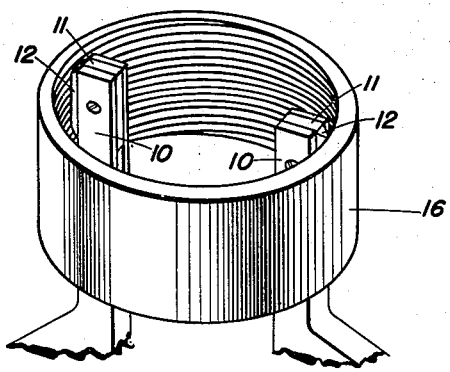
INVENTOR.
ROLAND D. SHERIDAN
BY Patented Aug. 19, 1952

2,607,123

UNITED STATES PATENT OFFICE 2,607,123

MEASURING FINGER FOR ULTRASENSITIVE COMPARATORS

Roland D. Sheridan, Washington, D. C.

Application November 14, 1949, Serial No. 127,209

2 Claims. (Cl. 33—143)

(Granted under the act of March 3, 1883, as amended April 30, 1928; 370 O. G. 757)

In general, the present invention relates to precision caliper measuring fingers, and more particularly to gaging tips for such fingers designed to facilitate highly accurate measurements, and particularly adapted to the diameter measurements of threaded bores, tubes, or the like.

A high degree of refinement has been obtained in the art of diameter measuring and comparing as is represented by such machines as the Pratt and Whitney Electrolimit Internal Comparator, Model B, List No. 2301 and the Sheffield Internal Comparator, Model N-4, by which diameter measurements may be obtained with an accuracy in the neighborhood of 20 millionths of an inch. However, the gaging tips provided on the measuring fingers of such calipering instruments are in the form of small tits or protuberances, affording minute contact points which are adequate as long as such machines are used only to measure the diameters of smooth surface bores, tubes, and the like. However, when it is desired to measure the internal or external diameter of objects having threaded surfaces, such gaging tips can be used only with difficulty and because of their construction accuracy of the measurement is substantially reduced. It will be apparent that such point contacts enter or partially enter the tapered grooves of the thread and can be reproducibly located only with great difficulty. The present invention is designed to overcome these limitations by providing novel gaging tips which span at least two threads of the bore or tube measured, i. e. of a minimum span of two thread pitch lengths, and in addition are pivotally mounted near the ends of the measuring fingers so that upon application of the tips to the threaded surface there will result an automatic alignment of the tips with the apexes of the threads and a consequent accurate diameter measurement of the threaded bore, tube, or the like.

It is, therefore, one object of the present invention to provide measuring fingers for gaging instruments enabling the accurate measurement of threaded objects.

Another object of the present invention is to provide gaging tips for the measuring fingers of a calipering device which facilitates the accurate diameter measurements of threaded bores, tubes, or the like.

Another object of the present invention is to provide measuring fingers for an ultra sensitive electrocomparator which enable the accurate measurement of diameter, taper, bellmouthed condition, or out-of-round condition of threaded bores, tubes, or the like.

A still further object of the present invention is to provide measuring fingers for a calipering device having elongated gaging tips pivotally mounted thereon for facilitating the accurate diameter measurements of threaded bores, tubes, or the like.

Other objects and advantages of the present invention will become apparent to one skilled in the art from a consideration of the following detailed description of one embodiment thereof, made in conjunction with the accompanying drawings in which like numerals refer to like or corresponding parts, and wherein:

Fig. 1 is a side elevational view of a pair of measuring fingers of a calipering device embodying the present invention;

Fig. 2 is an edge view of one of the measuring fingers shown in Fig. 1;

Fig. 3a is an enlarged side elevation of the gaging tip shown in Fig. 1.

Fig. 3b is a bottom view of the gaging tip shown in Fig. 3a;

Fig. 4a is a side elevation showing a modified form of gaging tip;

Fig. 4b is a bottom view of the gaging tip shown in Fig. 4a; and

Fig. 5 is an operational perspective view of the present invention in use.

Referring to the drawings, each of the pair of measuring fingers 10 of a precision calipering machine may be provided at its upper end with a slot 13 therein forming forked tines 17 and 18, wherein the gaging tip 11 is pivotally mounted by means of the pivot screw 14. The measuring fingers 10 may be made of any suitable structural material, but are preferably of such material as tool steel, while the gaging tips 11 are preferably formed of a hard wear resistant material as cemented metal carbide. The gaging tips 11 are preferably elongated and of a sufficient length along their contact edges 12 to span a plurality of threads of a threaded bore, tube, or the like to which they are to be applied in measuring the diameter thereof. The contact edges 12 are preferably rounded in form transversely of the direction of the contact edges to provide a minimum contact surface with the threaded object to be measured, and hence afford the highest degree of accuracy in measuring. As indicated above, the gaging tips 11 are pivotally mounted in slot 13 by means of the pivot screw 14. Since it is desirable to have free pivotal action of the tips 11 on the measuring fingers 10, an adjustment screw 15 is provided which cooperates with the pivot screw 14 to vary the frictional engagement between the sides of each tip 11 and the inside surfaces of its slot 13 by adjusting the distance between the tines 17 and 18 and positively holding the tines in adjusted relative position. It will be apparent that tightening of the pivot screw 14 operates to pull the tines 17 and 18 closer together, while tightening of the adjustment screw 15 operates to force the tines farther apart. Thus, by loosening adjustment screw 15 and tightening pivot screw 14 the tines 17 and 18 of the measuring finger 10 are brought into tighter frictional engagement with the sides of gaging tip 11 mounted therebetween in the slot 13, while tightening of adjustment screw 15 and loosening of pivot screw 14 forces the tines 17 and 18 into looser frictional engagement with the gaging tip. Thus, there is provided a pair of measuring fingers for a calipering device which provides an elongated and pivotable gaging tip mounted thereon whose pivotability may be positively adjusted to the desired degree of pivotal freedom.

Since the present invention is intended for use with ultrasensitive comparators having a direct reading indicating dial capable of showing variations of only twenty millionths of an inch it is essential that the gaging tips 11 or 11a be properly supported in the slot 13 so as to prevent any possible side play or movement of the tips aside from their pivoting movement as they adjust their position as they come into contact with the object to be measured. To this end it will be noted from the drawings that the parallel side faces of the rectangular shaped gaging tips are substantially the same width as the bifurcated end portion of the fingers 10 and that only the arcuate or rounded contact portion of the tips extend beyond the edge of the fingers. The relatively large area of contact between the sides of the tips and the walls of the slot precludes the possibility of any undesired side movement of the gaging tips when the adjustment screws have been properly set thus assuring uniform and accurate gaging results.

In employing the present invention to measure for example the internal diameter of an internally threaded thread gage 16, the fingers 10 are slipped into the bore of the gage 16, as shown in Fig. 5, to bring the contact edges 12 of the gaging tips 11 into engagement with the threads of the gage while the gage is moved horizontally to obtain a maximum reading. Since the elongated contact edges 12 of the gaging tips 11 bridge a plurality of threads of the gage, an accurate and reproducible measurement of the internal diameter of the gage is thus obtained with reference to the apexes of the threads. In the event that the gage 16 has a slight internal taper, because of the pivotability of the gaging tips 11 they assume the slight angle of the taper, and hence the points of measurement along the axis of the gage are referred substantially to the pivotal centers of the tips. If the tips 11 were not pivotable but fixed in position, a considerable error would result from a small internal taper of the gage 16, for the actual measurements that would result would be the internal diameter of the gage at one end or the other of the gaging tips' contact surfaces 12 rather than at a substantially fixed reference point, as the pivotal center of the gaging tips. To determine the existence or extent of internal taper or bellmouthed condition of the gage 16, a plurality of diameter measurements are taken on the gage along its axis, and the diameter measurements thus obtained indicate the existence and extent of such conditions. To determine the existence or extent of internal out of round of the gage 16, diameter measurements are taken at a plurality of degrees of rotation of the gage with respect to the measuring fingers, variations in these diameter measurements indicating the presence and extent of out-of-round condition.

The foregoing operational description relates to the determination of internal diameters, but as will be apparent to one skilled in the art, the two measuring fingers 10 as shown in Fig. 1 may each be turned 180 degrees so that the contact surfaces 12 of the gaging tips 11 face each other for facilitating external diameter measurements of externally threaded gages, tubes, or the like by a procedure similar to that outlined above. To adapt the present invention to both internal and external diameter measurements without reversal of the gaging fingers, the tips may be modified as indicated in Figs. 4a and 4b to provide each gaging tip 11a with two elongated contact surfaces 12a and 12b, each of said contact surfaces being similar in form to the surface 12 of the gaging tips 11. Gaging tips 11a may be mounted on each of the measuring fingers 10 in a manner similar to that described for the gaging tips 11, providing a pair of contact surfaces therefor extending in the directions of the contact surfaces of tips 11, and also providing a pair of contact surfaces extending toward each other, thus providing for the ready measurement of internal or external diameters without necessitating the turning of the fingers 10, as in the above-described embodiment.

Thus, by providing pivotable elongated gaging tips for the measuring fingers of a calipering device, the present invention enables the ready and accurate measurement of the internal or external diameters of threaded bores, tubes, or the like, the elongation of the gaging tips providing a known diameter reference to the apexes of the threads and the pivotability thereof providing a substantially fixed measuring reference point along the length of the gaging tips' contact surfaces. The foregoing detailed embodiments of the present invention are presented merely by way of example, and modification thereof within the spirit and scope of the present invention as defined by the appended claims will be apparent to those skilled in the art, such modifications being within the monopoly of the present patent.

The invention described herein may be manufactured and used by or for the Government of the United States of America for governmental purposes without the payment of any royalties thereon or therefor.

What is claimed is:

1. A measuring finger for use with ultrasensitive electrocomparators, said finger terminating in a pair of forked tines having spaced parallel plane inside surfaces, a substantially rectangularly shaped gaging tip pivotally mounted between said tines and having parallel plane outside surfaces frictionally engaging the inside surfaces of said tines, a pivot screw extending between said tines and pivotally carrying said tip, and an adjustment screw carried by one of said tines and bearing against the second tine, the tightening of said pivot screw and commensurate loosening of said adjustment screw driving said tines into tighter frictional engagement with said gaging tip and the tightening of said adjustment screw against the second tine and the commensurate loosening of said pivot screw causing the frictional engagement between said tines and said tip to loosen, thereby providing for the adjustment and positive fixing of the frictional engagement between the inner walls of said tines and the flat parallel sides of said tip.

2. A measuring finger for use with ultrasensitive electrocomparators comprising a pair of forked tines formed on said finger, a substantially rectangularly shaped gaging bar having flat parallel sides and pivotally supported between said tines, two elongated contact surfaces formed on opposite edges of said bar and being convex transversely of the direction of elongation, said contact surfaces being of a sufficient length to span a plurality of threads of a threaded object to be measured, said finger being substantially square in cross section at the bar supporting end and the width of the flat sides of the gaging bar being approximately equal to the width of the tines so that only the arcuate contact portions extend on each side beyond the tines thereby affording a large bearing area between the flat sides of the bar and the inner walls of the tines to assure against undesired side movement of the bar thereby providing for extremely accurate measurement of external or internal threaded objects by referring the measurement to the apexes of the threads and to a substantially fixed point on one of the elongated contact surfaces for internal measurements and to a similar point on the other contact surface for external measurements.

ROLAND D. SHERIDAN.

REFERENCES CITED

The following references are of record in the file of this patent:

UNITED STATES PATENTS

| Number | Name | Date |
| --- | --- | --- |
| 635,088 | Bowker | Oct. 17, 1899 |
| 1,145,852 | Schramm | July 6, 1915 |
| 1,398,311 | Bartholdy | Nov. 29, 1921 |
| 1,496,199 | Bath | June 3, 1924 |
| 1,908,253 | Johnson | May 9, 1933 |
| 2,249,954 | Hellberg et al. | July 22, 1941 |

FOREIGN PATENTS

| Number | Country | Date |
| --- | --- | --- |
| 277,608 | Germany | Dec. 24, 1914 |
| 571,316 | France | May 15, 1924 |